United States Patent [19]
Ito et al.

[11] Patent Number: 5,707,791
[45] Date of Patent: Jan. 13, 1998

[54] SILVER HALIDE PHOTOGRAPHIC LIGHT-SENSITIVE MATERIAL

[75] Inventors: Mineko Ito; Koichi Saito; Chieko Uehara, all of Hino, Japan

[73] Assignee: Konica Corporation, Japan

[21] Appl. No.: 585,488

[22] Filed: Jan. 16, 1996

[30] Foreign Application Priority Data

| Jan. 18, 1995 | [JP] | Japan | 7-005823 |
| Jan. 30, 1995 | [JP] | Japan | 7-012733 |

[51] Int. Cl.⁶ .................................................. G03C 1/76
[52] U.S. Cl. .................. 430/531; 430/523; 430/527; 430/530; 430/533; 430/536; 430/537; 430/627; 430/641; 430/496
[58] Field of Search ............................... 430/523, 531, 430/533, 536, 537, 327, 530, 627, 641, 496

[56] References Cited

U.S. PATENT DOCUMENTS

| 4,404,253 | 9/1983 | Kohler et al. | 428/327 |
| 5,318,826 | 6/1994 | Yasufuku et al. | 428/212 |
| 5,366,855 | 11/1994 | Anderson et al. | 430/530 |
| 5,432,050 | 7/1995 | James et al. | 430/523 |
| 5,447,832 | 9/1995 | Wang et al. | 430/523 |

FOREIGN PATENT DOCUMENTS

| 0511764 | 11/1992 | European Pat. Off. . |
| 0568008 | 11/1993 | European Pat. Off. . |
| 0603582 | 6/1994 | European Pat. Off. . |

OTHER PUBLICATIONS

Research Disclosure, No. 14359, Mar. 1976.

Primary Examiner—Geraldine Letscher
Attorney, Agent, or Firm—Jordan B. Bierman; Bierman, Muserlian and Lucas LLP

[57] ABSTRACT

A silver halide photographic light-sensitive material is disclosed, comprising a polyester support having on one side thereof a silver halide emulsion layer, and on the other side of the support, a layer containing a polyester resin or polyurethane resin and further thereon a magnetic recording layer.

11 Claims, 1 Drawing Sheet

SILVER HALIDE PHOTOGRAPHIC LIGHT-SENSITIVE MATERIAL

FIELD OF THE INVENTION

This invention relates to a silver halide photographic light-sensitive material comprising a magnetic recording layer with excellent adhesive property and scratch-resistance.

BACKGROUND OF THE INVENTION

Heretofore, information on a date of picture-taking, a diaphragm opening and an exposure time have been input optically, when a picture has been taken on a silver halide photographic light-sensitive material (hereinafter also referred simply to as a light-sensitive material). In contrast to the above, there have been such a proposal as described in U.S. Pat. Nos. 3,782,947, 4,279,945 and 4,302,523 for providing a transparent magnetic recording layer on the back side of a light-sensitive material so as to input the light-sensitive material, for example, a variety of information including for example, the kind, production lot number, the manufacturer's name and the emulsion number each of the light-sensitive material used, a variety of information on a picture-taking such as the date of picture-taking, the weather conditions, a diaphragm opening, an exposure time, a lighting condition, the kind of filter used and the size of a picture-taking frame, and the number of prints required, a trimming size, a message and the developing and printing requirements.

However, there have been such a trouble that a magnetic record is transferred to a printed image if the magnetic recording layer is damaged when transporting a light-sensitive material or when tracing the magnetic layer with a magnetic head, or that an error is produced when a magnetic information is played back. Therefore, a magnetic recording layer is to have such a property as is hard to be scratched. For this purpose, a magnetic recording layer has been formed by dissolving a non-aqueous type thermoplastic resin typified by a cellulose ester in an organic solvent and dispersing magnetic powder therein, and then by coating the resulting dispersion on a light-sensitive material, as described in Japanese Patent Publication Open to Public Inspection (hereinafter referred to as JP OPI Publication) No. 6-59357 (1994).

For achieving the miniaturization of a camera size, on the other hand, there has been such a proposal for a means for thinning the thickness of a support that various kinds of polyester films having an excellent mechanical strength are used in place of a triacetate film support (hereinafter referred sometimes as to a TAC film) that has so far been used in a roll film.

When making use of a polyester film as a support for a light-sensitive material, a sublayer is usually provided. However, from the viewpoints of working conditions and that any explosion-proof arrangement is not required, a aqueous-soluble or aqueous-dispersible resin has been used.

However, when a magnetic recording layer has an unsatisfactory adhesion to a hydrophilic sublayer because the magnetic recording layer comprises a non-aqueous type resin, it has had such a defect that a peeled-off portion may be produced in a development process or that the back-side layer thereof may be peeled off when the light-sensitive material is transported or when the magnetic recording layer is traced by a magnetic head.

SUMMARY OF THE INVENTION

This invention has been invented in consideration of the above-mentioned circumstances. It is therefore, an object of the invention to provide a silver halide photographic light-sensitive material comprising a magnetic recording layer having excellent scratch resistance, adhesive property and magnetic characteristics.

The above-mentioned objects of the invention can be achieved with a silver halide photographic light-sensitive material comprising a polyester support having a light-sensitive silver halide emulsion layer on one side thereof and a layer containing a aqueous-dispersible polyester resin or polyurethane resin and a magnetic recording layer on the other side of the support in this order.

Figure 1:
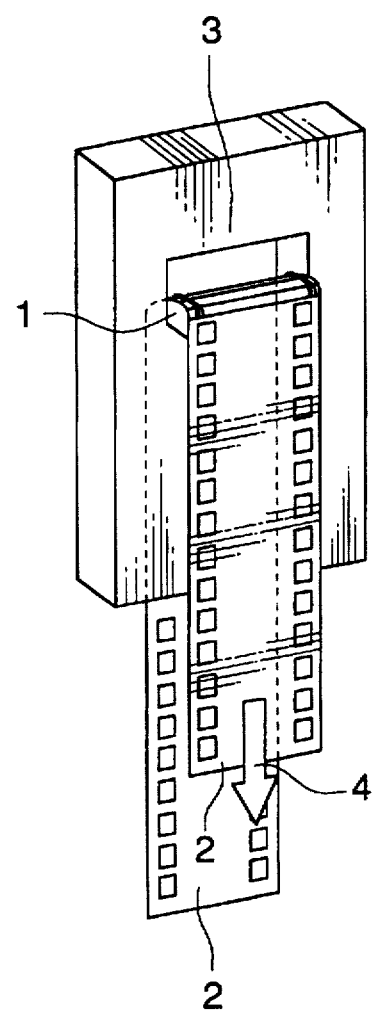
FIG. 1

A perspective view of a schematically illustrated tester that is used for measuring the perforation strength of a light-sensitive material of the invention, wherein 1 Sprocket section, 2 Film-end, 3 End of the tester, and 4 Film-end

DETAILED DESCRIPTION OF THE INVENTION

In the invention, a polyester resin means a substantially linear aqueous-soluble or aqueous-dispersible polyester obtained in a polycondensation of a polybasic acid or the ester-formable derivative thereof and a polyol or the ester-formable derivative thereof.

For making a polyester aqueous-soluble or aqueous-dispersible, there is contained a hydrophilic component such as a component having a sulfonate group, a diethylene glycol component and a polyalkylene ether glycol component, as a copolymerization component.

The polybasic acid components of the above-mentioned polyesters applicable thereto include, for example, terephthalic acid, isophthalic acid, phthalic acid, anhydrous phthalic acid, 2,6-naphthalene dicarboxylic acid, 1,4-cyclohexane dicarboxylic acid, adipic acid, sebacic acid, trimellitic acid, pyromellitic acid and dimeric acid. The diol components applicable thereto include, for example, ethylene glycol, 1,4-butane diol, neopentyl glycol, diethylene glycol, dipropylene glycol, 1,6-hexane diol, 1,4-cyclohexane dimethanol, xylene glycol, dimethylol propane, poly(ethylene oxide) glycol and polytetramethylene oxide.

In the invention, the preferable hydrophilic copolymerization components include, for example, an aromatic dicarboxylic acid having a sulfonate group.

The above-mentioned aromatic dicarboxylic acids containing a sulfonate group include, for example, 5-sodiumsulfoisophthalic acid, 2-sodiumsulfophthalic acid, 4-sodiumsulfophthalic acid and 4-sodiumsulfo-2,6-naphthalene-dicarboxylic acid. The above-given acids shall not be limited to the sodium salts thereof, but they may include the other cationic salts (including, for example, those of potassium, lithium, ammonium or phosphonium.)

The aromatic dicarboxylic acids having a sulfonate group applicable thereto are preferable to be used in a proportion within the range of 2 to 20 mol % and, preferably, 5 to 15 mol % of the whole polybasic acid component.

It is also preferable to use a dicarboxylic acid represented by the following formula (A), as the polybasic acid component.

   Formula (A)

wherein $R_1$ and $R_3$ represent each a hydrogen atom or an alkyl group having 1 to 8 carbon atoms; $R_2$ represents an alkylene group having 2 to 8 carbon atoms; and n is a positive integer of 1 to 100.

In the carboxylic acids represented by the above-given Formula (A), —($OR_2$)n— represents preferably a polyethylene oxy group, polytrimethylene oxy group or polytetramethylene oxy group.

A variety of processes may be used for synthesizing a aqueous-soluble or aqueous-dispersible polyester relating to the invention. For example, they may be prepared in a transesterification process, or the following well-known process, wherein an initial condensate of dicarboxylic acid and glycol is formed in a direct esterification process and the resulting condensate is melt-polymerized. To be more concrete, the processes include, for example, a process in which a dicarboxylic acid ester such as dimethyl ester of dicarboxylic acid and glycol are subjected to a transesterification reaction so as to distill methanol and, the pressure is then gradually reduced and a polycondensation is carried out in a high vacuum; another process in which dicarboxylic acid and glycol are subjected to an esterification reaction and water produced therein is distilled and, the pressure is then gradually reduced and a polycondensation is carried out in a high vacuum; and a further process in which a dicarboxylic acid ester and glycol are subjected to a trans-esterification reaction and dicarboxylic acid is further added thereto so as to carry out an esterification reaction and, a polycondensation is carried out in a high vacuum.

As for the trans-esterification catalysts and the polycondensation catalysts, any one having been well-known may be used. The trans-esterification catalysts applicable thereto include, for example, manganese acetate, calcium acetate and zinc acetate. The polycondensation catalysts applicable thereto include, for example, antimony trioxide, germanium oxide, tin dibutyl oxide and titanium tetrabutoxide. However, the various requirements such as the polymerization processes and catalysts uses therein shall not be limited to the above-given examples.

Polyester relating to the invention may be either a copolymer or a composition each having a vinyl type polymer as the constitutional element thereof. These copolymers or compositions may be prepared by polymerizing vinyl type monomers in the presence of a aqueous-soluble or aqueous-dispersible polyester and, for example, by polymerizing vinyl type monomers upon dissolving or dispersing the vinyl type monomers in an organic solvent solution of a aqueous-soluble or aqueous-dispersible polyester or the aqueous solution thereof.

In the invention and when synthesizing the above-mentioned aqueous-soluble or aqueous-dispersible polyester, it is also allowed that an addition-polymerizable group such as a carboxylic acid group, a glycidyl group or an amino group is introduced in advance thereinto so that a branch polymer may be formed to the addition-polymerizable group by polymerizing the vinyl type monomers in the presence of a polyester.

It is not preferable to use an organic solvent for polymerizing the vinyl type monomers in the presence of a polyester, because the processing arrangements may be complicated and the working environment may also be polluted. From the above-mentioned viewpoints, it is preferable to dissolve or suspend a polyester in hot water and to dispersively add vinyl type monomers in a polyester matrix so that they may be subjected to an emulsion-polymerization or a suspension-polymerization.

For polymerizing vinyl type monomers, a polymerization initiator is used. The polymerization initiators applicable thereto include, for example, ammonium persulfate, potassium persulfate, sodium persulfate and benzoyl peroxide. Among them, ammonium persulfate is preferred.

In the matrix of the aqueous-soluble or aqueous-dispersible polyester, the vinyl type monomers may be polymerized without using any surfactant. However, it is also allowed to use a surfactant as an emulsifier for the purpose of improving the polymerization stability. When this is the case, any ordinary nonionic or anionic type surfactants may either be used.

When making a graft-polymerization of vinyl type monomers to a aqueous-soluble or aqueous-dispersible polyester, a graft polymer coupling the branch polymer to the trunk polymer is formed and at the same time the polymer of vinyl type monomers is also formed. However, the vinyl type polymer formed thereby is allowed to remain unremoved.

For obtaining a copolymer having a aqueous-soluble or aqueous-dispersible polyester and a vinyl type polymer as the constitutional elements, it is advisable to use the vinyl type monomers so as to be within the proportion range of (polyester)/(vinyl type monomer) of, preferably, 99/1 to 5/95, more preferably, 97/3 to 50/50 and, further, 95/5 to 80/20.

The vinyl type monomers applicable thereto include, for example, an acryl type monomer such as alkyl acrylate and alkyl methacrylate (of which the alkyl groups include, for example, methyl group, ethyl group, n-propyl group, isopropyl group, n-butyl group, isobutyl group, t-butyl group, 2-ethylhexyl group, cyclohexyl group, phenyl group, benzyl group and phenylethyl group); a hydroxy group-containing monomer such as 2-hydroxyethyl acrylate, 2-hydroxyethyl methacrylate, 2-hydroxypropyl acrylate and 2-hydroxypropyl methacrylate; an amido group-containing monomer such as acrylamide, methacrylamide, N-methyl methacrylamide, N-methyl acrylamide, N-methylol methacrylamide, N-methylol acrylamide, N,N-dimethylol acrylamide, N-methoxymethyl acrylamide,N-methoxymethyl methacrylamide and N-phenyl acrylamide; an amino group-containing monomer such as N,N-diethylaminoethyl acrylate and N,N-diethylaminoethyl methacrylate; an epoxy group-containing monomer such as glycidyl acrylate and glycidyl methacrylate; and a monomer containing carboxyl group or the salt thereof, such as acrylic acid, methacrylic acid and the salts thereof (including a sodium salt, a potassium salt and an ammonium salt). The monomers other than those of the acryl type include, for example, an epoxy group-containing monomer such as allyl glycidyl ether; a monomer containing sulfonic acid group or the salt thereof such as styrene sulfonic acid group or the salt thereof (such as sodium salt, potassium salt and ammonium salt thereof); a monomer containing a carboxyl group or the salt thereof (such as crotonic acid, itaconic acid, maleic acid, fumaric acid and the salt thereof (such as sodium salt, potassium salt and ammonium salt thereof); a monomer containing an acid anhydride such as maleic anhydride and itaconic anhydride; vinyl isocyanate; allyl isocyanate; styrene; vinyl trisalkoxysilane; alkylmaleic acid monoester; alkylfumaric acid monoester; acrylonitrile; methacrylonitrile; alkyl itaconic acid monoester; vinylidene chloride; vinyl acetate; and vinyl chloride. The above-given monomers may also be used independently or in combination.

When the polyester type resins relating to the invention are aqueous-dispersible, the particle-size thereof is to be not larger than 5 μm, preferably, not larger than 1 μm and, further preferably, not larger than 0.1 μm. Further, the lower limit of the particles size is not smaller than 1 nm, preferably not smaller than 5 nm and more preferably not smaller than 10 nm. If the particle-size thereof is too large, not only the thickness of a coated layer cannot be thinned, but also the transparency of the coated layer is deteriorated.

Polyurethane resin of the present invention is referred to as a polymer compound having a urethane bond (carbamic acid ester bond), which can be obtained by the reaction of a polyisocyanate with a polyol.

In the case where either of the polyisocyanate and polyol is di-functional, there can be obtained a linear thermoplastic polyurthane. In the case where at least one of them is tri-functional or chain reaction has occurred, there is formed polyurethane having networks.

The polyisocyanate includes an aromatic one and aliphatic one including an aliphatic ring compound.

As examples of the aromatic polyisocyanate, are cited tolylenediisocyanate, diphenylmethanediisocyanate, polymethylenediisocyanate, polymethylenepolyphenylenediisocyanate, tolydinediisocyanate and naphthalenediisocyanate.

As examples of the aliphatic polyisocyanate, are cited hexamethylenediisocyanate, isophoronediisocyante, xylylenediisocyanate, dicyclohexylmethanediisocyanate and hydrogenated xylylenediisocyanate.

As the polyol can be used various kinds of polyols having plural hydroxyl groups, including mainly a polyether type polyol, polyester type polyol and hydrocarbon type polyol.

As examples of the polyether type polyol, are cited polyoxypropylenepolyol which can be obtained by the ring-opening polymerization of polyoxypropylene with a polyhydric alcohol or polyamine and polyetherpolyol which can be obtained by the polymerization of acrylonitrile or styrene with polyoxypropylenepolyol.

As examples of the polyester type polyol, are cited polyadipate plyol which is condansation product from adipinic acid and a glycol (e.g., ethylene glycol or butylene glycol) or triol (e.g., trimethylolpropane or glycerin); and polycaprolactonediol which is a ring-opening polymerization product of ε-caprolactone.

As examples of the hydrocarbon type polyol, are cited polybutadiene polyol which has hydroxy groups at the end of butadiene homopolymer or its copolymer with acrylonirile or styrene and polyacrylate polyol which is a copolymer of an acrylic acid ester and hydroxyethylmethaacrylate.

In order to shorten the manufacturing process of the polyurethane, there can be used a catalyst which accelerates the reaction of isocyanate with polyol. As examples of the catalyst are cited tin octylate, dibutyltin dilaurate and lead actylate.

The polyurethane resin used in the present invention is aqueous-dispersible.

As a method for making the resin aqueous-dispersible, there are cited, (a) a method in which, immediately after an urethane prepolymer having terminal isocyanate groups is forced to be emulsified by strongly stirring, the prepolymer is further polymerized with a polyamine;

(b) a method in which the resin itself is made water-dispersible by introducing a carboxyl group, sulfon group or tertiary amino group into the polyurethane and ionizing the group;

(c) a method in which isocyanate groups are blocked with sodium bisufite and the resuting adduct is emulsified; and (d) a method in which the polyurethane is dissolved in an organic solvent solution and the resulting solution is dispersed in water containing an emulsifying agent, and if necessary, the solvent may be removed.

In the present invention, an average particle size of the polyurethane dispersed in water is 5 μm or less, preferably 1 μm, more preferably 0.5 μm or less and furthermore preferably 0.1 μm. The lower limit thereof is 1 nm or more, preferably 5 nm or more and more preferably 10 nm or more.

In the case when the particl size is larger, it is not only impossible to make a coating layer thin but also it causes to deterirate transparency of the coating layer.

To a layer containing an aqueous-dispersible polyester resin or polyurethane resin relating to the invention, it is allowed to add other binder, a cross-linking agent, a matting agent, an antiblocking agent and an antistatic agent, provided that the effects of the invention cannot be spoiled.

The matting agents include, without any special limitation, for example, inorganic compound particles such as those of silicon dioxide, titanium dioxide and aluminum oxide and high molecular compounds having a glass-transition point of not lower than 50° C. such as polystyrene and polymethyl methacrylate.

Next, the antistatic agents preferably applicable to the invention include without special limitation, for example, a conductive polymer and a metal oxide.

There is no special limitation to the conductive polymers, and any one of those of the anionic, cationic, amphoteric or nonionic type may be used for. Among them, those of the anionic and cationic types are preferred. More preferable polymers or latexes for the anionic type include, for example, those of the sulfonic acid type and the carboxylic acid type, and more preferable ones for the cationic type include, for example, those of the tertiary amine type and quaternary ammonium type. These conductive polymers include, for example, the anionic polymers or latexes given in JP Examined Publication Nos. 52-25251/1977 and 60-48024/1985 and JP OPI Publication No. 51-29923/1976, and the cationic type polymers or latexes given in JP Examined Publication Nos. 57-18176/1982, 57-56059/1982 and 58-56856/1983, U.S. Pat. No. 4,118,231 and so forth.

Some concrete examples of the above-mentioned conductive polymers or latexes will be given below. However, there is not limited thereto.

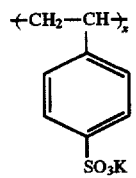

P-1

Number-average molecular weight 150,000

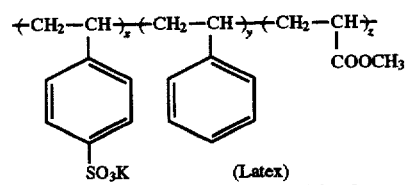

P-2

(Latex)
x:y:z = 25:60:15

P-3

$$\mathrm{+CH-CH\}_x(CH_2-CH\}_y}$$
with COONa, COONa on first unit and COOCH$_2$CH$_2$OH on second x:y = 70:30
Number-average molecular weight 45,000

P-4

$$\mathrm{+CH_2-CH\}_x+CH-CH\}_y}$$
with phenyl-SO$_3$NH$_4$ and COOH, COOH substituents x:y = 50:50
Number-average molecular weight 5,000

P-5

$$\mathrm{+CH_2-CH\}_x+CH-CH\}_y}$$
with phenyl-SO$_3$Na and COOH, COOH substituents x:y = 75:25
Number-average molecular weight 5,000

P-6

$$\mathrm{+CH_2-CH\}_{100}}$$
with phenyl-CH$_2$SO$_3$K substituent

Number-average molecular weight 60,000

P-7

$$\mathrm{+CH_2-CH\}_{50}(CH_2-CH\}_{50}}$$
with phenyl-CH$_2$SO$_3$K and CONH$_2$ substituents Number-average molecular weight 30,000

P-8

$$\mathrm{+CH_2-CH\}_{80}(CH_2-CH\}_{20}}$$
with phenyl-CH$_2$SO$_3$Na and phenyl substituents Number-average molecular weight 10,000

P-9

$$\mathrm{+CH_2-CH\}_{50}+CH-CH\}_{50}}$$
with phenyl-CH$_2$SO$_3$Na and COOH, COONa substituents Number-average molecular weight 20,000

P-10

$$\mathrm{+CH_2-CH\}_x+CH_2-CH\}_y}$$
with phenyl-CH$_2$N(C$_2$H$_5$)$_2$·HCl and phenyl substituents  (Latex)

x:y = 30:70

P-11

Poly[phenylene-CH$_2$-N$^+$(DABCO)-N$^+$-CH$_2$] with 2Cl$^-$

Number-average molecular weight 10,000

P-12

$$\mathrm{+CH_2-phenyl-CH_2-N^+(CH_3)_2\}_x}$$ Cl$^-$

Number-average molecular weight 30,000

P-13

$$\mathrm{+^+N(CH_3)_2-CH_2-CH_2-^+N(CH_3)_2-CH_2-phenyl-CH_2\}_n}$$ 2Br$^-$ n ≈ 17

P-14

$$\mathrm{+CH_2-CH\}_{n1}+CH_2-CH\}_{n2}}$$
with phenyl-CH$_2$N(CH$_3$)$_3$·Cl$^-$ and phenyl-CH-CH$_2$— substituents  (Latex)

n$_1$:n$_2$ = 90:10

P-15

$$\mathrm{+CH_2-CH\}_{n1}+CF_2-CF_2\}_{n2}}$$
with phenyl-CH$_2$N(CH$_3$)$_3$·Cl$^-$ substituent n$_1$:n$_2$ = 60:40
Number-average molecular weight 40,000

P-16

$$\mathrm{+CH_2-C(CH_3)\}_{n1}---+CH_2-CH\}_{n2}}$$
with CO-OCH$_2$CH$_2^+$N(C$_2$H$_5$)$_2$-CH$_3$·CH$_3$SO$_4^-$ and O-CO-C$_3$F$_7$ substituents n$_1$:n$_2$ = 80:20
Number-average molecular weight 10,000

These conductive polymers may be used independently. However, it is preferable to use them with other binders in combination and then to be coated on. It is further allowed to use a hardening agent together with the above-mentioned binders.

The contents of the conductive polymer is to be within the range of, preferably, 0.005 to 5 g/m², more preferably, 0.01 to 3 g/m² and, further preferably, 0.02 to 1 g/m².

When making combination use of a binder, the proportion by weight of the subject conductive polymer or latex to the binder is to be within the ratio of, preferably, 99:1 to 10:90, more preferably, 80:20 to 20:80 and, particularly, 70:30 to 30:70.

The examples of the metal oxides include, preferably, an excess-oxygen oxide such as $Nb_2O_{5+x}$, an oxygen-deficiency oxide such as $RhO_{2-x}$ and $Ir_2O_{3-x}$ or a non-stoichiometric oxide such as $Ni(OH)_x$ and $HfO_2$, $ThO_2$, $ZrO_2$, $CeO_2$, $ZnO$, $TiO_2$, $SnO_2$, $Al_2O_3$, $In_2O_3$, $SiO_3$, $MgO$, $BaO$, $MoO_2$ and $V_2O_5$ or the composite oxides thereof. Among them $ZnO$, $TiO_2$ and $SnO_2$ are particularly preferred. As for the examples of those containing a foreign atom, it is effective to add Al, In and so forth to $ZnO$, Nb, Ta and so forth to $TiO_2$ and Sb, Nb, a halogen element and so forth to $SnO_2$. The proportion of adding these foreign atoms is to be within the range of, preferably, 0.01 mol % to 25 mol % and, particularly, 0.1 mol % to 15 mol %.

There is no special limitation to the particle sizes of the above-mentioned metal oxides. However, the primary particle sizes thereof is, preferably, not larger than 10μ, more preferably, not larger than 5μ and, particularly, not larger than 1μ.

When determining the particle size thereof, it is preferable to adopt an average particle size obtained from the measurement made in a precipitation method, a laser-diffraction method or the like with the use of a particle-size meter. It is also allowed to determine a particle size through an electron micrography. When making use of an electron micrography, however, the measurement is to be made in terms of a high-order structure unit if a high-order structure is formed in the field of view.

There is no special limitation to the amount of metal oxide particles to be added to a binder. However, they may be added in a proportion of, preferably, not more than 50 vol %, more preferably, not more than 40 vol % and, further, not more than 30 vol %.

The amount of a metal oxide may be used in an amount within the range of 0.00005 to 1 g per m² of a photographic light-sensitive material used.

Binders applicable together with a conductive polymer and metal oxide particles include, for example, protein such as gelatin, colloidal albumin and casein; a cellulose compound such as carboxymethyl cellulose, hydroxyethyl cellulose, diacetyl cellulose and triacetyl cellulose; a sugar derivative such as agar-agar, sodium alginate and a starch derivative; a synthetic hydrophilic colloid such as polyvinyl alcohol, poly-N-vinyl pyrrolidone, a polyacrylic acid copolymer, and polyacrylamide or the derivatives and copolymers thereof; natural matters such as rosin, and shellac or the derivatives thereof; and many other synthetic resins. Besides the above, it is also allowed to use an aqueous emulsion such as those of a styrene-butadiene copolymer, polyacrylic acid, a polyacrylic ester and the derivatives thereof, polyvinyl acetate, a vinyl acetate-acrylic acid ester copolymer, polyolefin and an olefin-vinyl acetate copolymer.

The volume resistibility of these metal oxide particles is to be not higher than $10^{10}$ Ωcm, preferably, not higher than $10^7$ Ωcm and, particularly, not higher than $10^5$ Ωcm.

A volume resistibility value means the volume resistibility of a single crystal in the case of an oxide from which a relatively larger single crystal can be obtained, and it means the volume resistibility of a sintered body prepared of molding powder in the case where any relatively larger single crystal cannot be obtained. If the value is unknown, there adopts a value obtained by dividing, by $10^2$, the volume resistibility of a molded material prepared by applying a certain constant pressure in the powdered state. There is no special limitation to a certain constant pressure, but the pressure is applied to be, preferably, not lower than 10 kg/m² and, more preferably, not lower than 100 kg/m², and there adopts a value obtained by dividing, by $10^2$, the volume resistibility of a material molded by applying the above-mentioned pressure. Generally, when a pressure is applied higher to a powdered material, the volume resistibility of the molded material is inclined to be lowered. However, even when an isotropic pressure of 3 t/cm² is applied from a hydrostatic pressurizer, any value lower than a volume resistibility value obtained from a single crystal cannot be obtained, but the value becomes about 100 times higher. Therefore, a value obtained by dividing, by $10^2$, the volume resistibility of a molded material prepared by applying a certain constant pressure in the powdered state.

The above-mentioned antistatic agent may be made present in at least one of the component layers of a light-sensitive material, for example, a sublayer on the back side or the back side layer of the light-sensitive material.

Further, these antistatic agent may also be mixed with a aqueous-soluble or aqueous-dispersible polyester resin of the invention. If this is the case and when an antistatic agent is mixed in a proportion of not more than 50 vol % and preferably not more than 30 vol % of the subject polyester resin, the effect of the invention can be enjoyed without spoiling the adhesive property thereof to a magnetic recording layer adjacent thereto.

Now, the magnetic recording layer will be detailed.

The magnetic fine powder applicable to a magnetic recording layer of the invention include, for example, a magnetic metal powder, a magnetic iron oxide powder, a magnetic Co-doped iron oxide powder, a magnetic chromium dioxide powder and magnetic barium ferrite powder. The preparation processes of these magnetic powder have already been known. The magnetic powder applicable to the invention can also be prepared in any known processes.

There is no special limitation to the forms and sizes of magnetic powder, so that the wide range thereof can be used. The forms thereof may be any one of a needle form, rice grain form, globular form, cubic form and tabular form. Among the forms, the needle forms and the tabular forms are preferable from the viewpoint of electromagnetic transconductance characteristics. There is no special limitation to a crystallite size and a specific surface area. The magnetic powder may also be used even if it is surface-treated. For example, they may be surface-treated with a material containing such an element as titanium, silicon or aluminum, and they may also be treated with an organic compound like an adsorptive compound having a nitrogen-containing heterocyclic ring of carboxylic acid, sulfonic acid, a sulfate, phosphonic acid, a phosphate or benzotriazole. There is also no special limitation to the pH of a magnetic powder, but it is preferable to be within the range of 5 to 10.

A publication, "Television", Vol. 20, No. 2, "Characteristics of a super-fine grained translucent magnetic recording medium and the application thereof" describes that there is a correlation between the sizes of magnetic particles and the transparency thereof. In the needle formed powder of $\gamma$-$Fe_2O_3$, for example, the light transmittance thereof can be improved when making the particle size thereof smaller.

U.S. Pat. No. 2,950,971 describes that infrared rays can transmit through a magnetic layer comprising magnetic iron oxide dispersed in a binder. In U.S. Pat. No. 4,279,945, there is the following description. Even in the case where a magnetic particle density is relatively high in a magnetic layer and when making the particle size smaller, the transmittance of helium-neon laser beam having a wavelength of 632.8 nm can be improved.

However, when a magnetic recording layer is arranged to the image-forming region of a silver halide color photographic light-sensitive material, it is necessary to make the light transmittance higher in not only the red color region, but also the green and blue color regions.

For making the light transmittance higher in the red, green and blue color regions, the particle size of magnetic particle is to be made smaller and, at the same time, the amount of the magnetic particles to be coated is also limited.

If making a magnetic particle size smaller than a certain degree, the necessary magnetic characteristics cannot be obtained. It is, therefore, preferable to make the magnetic particle size smaller within the scope where the necessary magnetic characteristics can be obtained. If an amount of magnetic particles to be coated is made smaller then a certain degree, the necessary magnetic characteristics cannot also be obtained. It is, therefore, preferable to make the magnetic particle size smaller within the scope where the necessary magnetic characteristics can be obtained.

For practical use, an amount of the magnetic particles to be coated is to be within the range of 0.001 to 3 g/m$^2$ and, preferably, 0.01 to 1 g/m$^2$.

The binders applicable to a magnetic recording layer include, for example, a thermoplastic resin, a radiation-hardenable resin, thermohardenable resin, other reactive resin and the mixtures thereof, each of which has so far been used for a magnetic recording medium.

The thermoplastic resins are to have a glass transition point Tg within the range of $-40°$ C. to $150°$ C. and, preferably, $60°$ C. to $120°$ C. and to have a weight average molecular weight within the range of, preferably, 10,000 to 300,000 and, more preferably, 50,000 to 200,000.

In the invention, the binders applicable to a magnetic recording layer are preferable to be comprised principally of a cellulose ester. To be more concrete, they include, for example, those of the cellulose acetate type such as cellulose diacetate, cellulose acetate butylate, cellulose acetate propionate; cellulose nitrate; cellulose sulfate; and the mixed esters thereof. Among them, cellulose diacetate, cellulose acetate butylate and cellulose acetate propionate are preferable. Further among them, cellulose diacetate is particularly preferable.

The binders may be hardened. The hardeners applicable thereto include, for example, an aldehyde type compound, a ketone compound, a compound having a reactive halogen, a compound having a reactive olefin, N-hydroxymethyl phthalimide, a N-methylol compound, an isocyanate, an aziridine compound, an acid derivative, an epoxy compound, a halogen carboxyaldehyde and an inorganic compound type hardener.

The hardeners are commonly used in a proportion within the range of 0.01 to 30% by weight of a binder used and, preferably, 0.05 to 20% by weight thereof.

Magnetic particles are dispersed in a binder by making use of a solvent if required, so that a coating solution may be prepared. For dispersing the magnetic particles, a ball-mill, a homomixer, a sand-mill or the like may be used. In this case, it is preferable that every magnetic particle is separately dispersed as best as one can.

When forming an optically transparent magnetic recording layer, the binder is to be used in a proportion within the range of, preferably, 1 to 20 parts by weight to a part by weight of magnetic powder and, more preferably, 2 to 15 parts by weight thereto. The solvent is to be used in such an amount that a coating can readily be performed.

The thickness of a magnetic recording layer is to be within the range of, preferably, 0.1 to 10 μm, more preferably, 0.2 to 5 μm and, further preferably, 0.5 to 3 μm.

For providing a magnetic recording layer with the improved function of lubricity, static protection, adhesion protection and friction & abrasion protection, a variety of additives such as a lubricant and an antistatic agent may be added to a coating solution for forming a magnetic recording layer. Besides the above, the coating solution may also be added by, for example, a plasticizer for providing a magnetic recording layer with flexibility, a dispersant for assisting the dispersion of magnetic material in the coating solution, and an abrasive for protecting a magnetic head from being clogged.

If required, it is also allowed that a protective layer is arranged to the outermost layer adjacent to a magnetic recording layer so that the scratch resistance can be improved. For providing the scratch resistance thereto, a compound having generally been known as a lubricant may be used, and the lubricants include preferably a higher aliphatic acid ester. When magnetic recording layers are arranged stripewise, it is allowed that a transparent polymer layer not containing any magnetic material is arranged onto the magnetic layers, so that steps produced by the magnetic recording layers can be eliminated. In this case, it is also allowed to provide the above-mentioned functions to the trans parent polymer layer.

Now, a polyester support relating to the invention will be detailed.

A support of the invention is of a polyester mainly comprising a dicarboxylic acid component and a diol component.

The dicarboxylic acid component that is a main constitutional component of the above-mentioned support include, for example, terephthalic acid, isophthalic acid, phthalic acid, 2,6-naphthalene dicarboxylic acid, 2,7-naphthalene dicarboxylic acid, diphenylsulfone dicarboxylic acid, diphenylether dicarboxylic acid, diphenylethane dicarboxylic acid, cyclohexane dicarboxylic acid, diphenyl dicarboxylic acid, diphenylthioether dicarboxylic acid, diphenylketone dicarboxylic acid and phenylindan dicarboxylic acid. The diol component include, for example, ethylene glycol, propylene glycol, tetramethylene glycol, cyclohexane dimethanol, 2,2-bis(4-hydroxyphenyl)propane, 2,2-bis(4-hydroxyethoxy phenyl)propane, bis(4-hydroxy phenyl) sulfone, bisphenol fluorene dihydroxyethyl ether, diethylene glycol, neopentyl glycol, hydroquinone and cyclohexane diol. Among the polyesters mainly comprising the above-given components as the principal constitutional components and from the view points of transparency, mechanical strength and dimensional stability, terephthalic acid and/or 2,6-naphthalene dicarboxylic acid are preferable for the dicarboxylic acid components, and the polyesters mainly comprising ethylene glycol and/or 1,4-cyclohexane dimethanol are preferable for the diol components. Among them, it is more preferable to use a polyester comprising polyethylene terephthalate and terephthalic acid, a polyester comprising 2,6-naphthalene dicarboxylic acid and ethylene glycol, and a polyester principally comprising a mixture of two or more kinds of these polyesters. When an ethylene terephthalate unit and/or an ethylene-2,6-naphthalate unit are contained in a proportion of not less than 70% by weight of the subject polyester, a film having superbly excellent transparency, mechanical strength, dimensional stability and so forth can be obtained.

Provided that the effects of the invention cannot be spoiled, a polyester constituting a polyester film relating to the invention may further be copolymerized with the other copolymer components and may still further be mixed with the other polyesters. The examples thereof may include the foregoing dicarboxylic acid components, diol components or polyesters already given above.

It is preferable to contain a dyestuff in a polyester applicable to the invention for the purpose of preventing the production of the so-called light-piping phenomenon. The dyestuffs to be compounded for the above-mentioned purpose shall not specially be limited to the kinds thereof. However, as it is necessary for the dyestuffs to have an excellent heat-resistance, from the viewpoint of manufacture, therefore, they may include those of the anthraquinone type and the perylene type. As for the color tone, a dye in gray is preferable, as seen in the ordinary photographic light-sensitive materials.

There is no special limitation to the thickness of a polyester film of the invention. However, the thickness thereof is to be within the range of, preferably, 20 to 125 μm and, particularly, 40 to 90 μm.

It is preferable that a polyester film of the invention has a haze of not more than 3% and it is more preferable to be not more than 1%. When the haze thereof is more than 3%, an image printed on a photographic printing paper is blurred to be fazzy. The above-mentioned haze is measured in accordance with ASTM-D1003-52.

The glass transition point Tg of a polyester film of the invention is to be, preferably, not lower than 60° C. and, more preferably, within the range of not lower than 70° C. to not higher than 150° C. Such a Tg can be obtained by measuring through a differential scanning calorimeter. When a Tg is within the above-specified range, the subject film is not deformed in a drying process carried out through a development processor, so that a light-sensitive material having a little core set curl can be obtained after completing a development process.

Next, the preparation process of a polyester film of the invention will now be detailed. However, there is no special limitation thereto.

The processes for preparing an unstretched sheet and for uniaxially stretching the sheet in the longitudinal direction can be performed in any processes having so far been known. For example, an unstretched sheet can be prepared in the following manner. A raw polyester material is molded to be in the pellet shape. The resulting pellets are hot-air or vacuum dried and are then fusibly extruded. The resulting fusion is extruded in the sheet-shape from a T-die. The resulting sheet is brought into close contact with a cooling drum in an electrostaticity application method or the like so as to be cooled and solidified and thereby the unstretched sheet can be prepared. Next, the resulting unstretched sheet is heated at a temperature within the scope of Tg of the polyester to the Tg+100° C. through plural rolls and/or an infrared heater and so forth, so that the heated sheet is single- or multi-step stretched in the longitudinal direction. It is necessary that the stretching ratio thereof is to be limited usually within the range of 2.5 times to 6 times, that is the range in which the consecutive lateral stretching can be done.

The resulting polyester film having been uniaxially stretched in the longitudinal direction is stretched in the lateral direction at a temperature within the range of Tg–Tm (i.e., a melting point) and is then heatedly fixed. The laterally stretching ratio is usually within the range of 3 to 6 times. Upon measuring the physical property of the resulting biaxially stretched film, the ratio of the longitudinal stretching to the lateral stretching is suitably adjusted so as to have the preferable characteristics. It is generally preferable to keep the balance between the widthwise direction and the lengthwise direction. However, it is also allowed to vary it so as to meet the purpose of the application. In this case, it is preferable to laterally stretch the film while gradually raising the temperature difference to be within the range of 1° to 50° C. between two or more divided stretching areas, because the distribution of the property in the widthwise direction can be reduced. In addition to the above, it is also preferable to keep the film for 0.01 to 5 minutes at a temperature within the range of not higher than the final laterally stretching temperature to not lower than a temperature of Tg-40° C., because the distribution of the property in the widthwise direction can further be reduced.

The heat fixing is carried out at a temperature within the range of a temperature higher than the final lateral stretching temperature to a temperature not higher than Tm-20° C., for a period of time within the range of usually 0.5 to 300 seconds. At this time, it is preferable to carry out the heat fixing while gradually raising the temperature difference between two or more divided areas to be within the range of 1° to 100° C.

The resulting heatedly fixed film is usually cooled down to a temperature not higher than Tg. The portions clipped on both ends of the film are cut off and the film is then wound up. At this time, it is preferable to loosen the film tension by 0.1 to 10% in the widthwise and/or lengthwise direction at a temperature within the range of not higher than the final heat fixing temperature to a temperature not lower than Tg. It is also preferable to gradually cool down the heat fixed film at a rate of not higher than 100° C. per second from the final heat fixing temperature to Tg.

The optimum conditions of the above-mentioned heat fixing, cooling and loosening conditions are varied according to various polyester constituting a film. Therefore, the optimum conditions may be determined by measuring the physical property of the resulting biaxially stretched film and then by suitably adjusting the property thereof so as to have the preferable property.

A polyester film is treated in various methods for reducing the core set curl thereof. As described in JP OPI Publication No. 51-16358/1976, for example, there is a method for heat treating a polyester film at a temperature lowered by 30° C. to 5° C. from the glass transition point Tg. On the other hand, JP OPI Publication No. 1-131550/1989 described the following method; in a consecutive biaxial stretching process, a temperature gradient is provided to the two sides of a film between the longitudinal and lateral stretching so as to produce the differences of the crystallinity and orientation of the subject film and thereby a permanent core set curl is produced. There are some known methods, namely, a method in which a film is wound up reversely to the aged curling produced in storage as the final product so as to cancel each other; and another method in which a polyester film, that is so prepared as to have a temperature difference when it is stretched, is heat treated at a temperature within the range of not higher than the glass transition point thereof to not lower than 50° C. The supports effectively produced in a heat treatment so as to hardly produce a core set curl include, for example, a polyester having a glass transition point within the range of not lower than 90° C. to not higher than 200° C. This is because the effects of the heat treatment is lost when a film is exposed to a temperature exceeding the glass transition point thereof, it is, thereby, necessary to have a glass transition point of not lower than 90° C. as a criterion of the highest temperature (there may also be some instances where a temperature exceeds 80° C. in an automobile in summer) exposed to a common user when he uses a film. There has not been any transparent polyester film for general use and having a glass transition point exceeding 200° C.

The particularly preferable polyester like the above include, for example, polyethylene naphthalate and the copolymers or compositions made of polyethylene naphthalate as the raw material thereof. These supports are preferable to be used upon making a biaxial stretching and then heat fixing treatments. If required, it is also allowed to heat loosen the supports.

In this case, the heat treatment is to be carried out at a temperature within the range of not lower than 50° C. to not higher than the glass transition point of the subject film for a period of time within the range of not shorter than 0.1 hours to not longer than 1500 hours. Among the heat treatments, the particularly preferable treatment is to be carried out at a Tg of about 120° C. in the case of making use of polyethylene naphthalate. Therefore, the heat treatment is to be carried out, preferably, at a temperature of not higher than 119° C. for a period of time within the range of 0.2 to 72 hours and, more preferably, at a temperature of not higher than 119° C. for a period of time of the order of 24 hours. In particular, for making a heat treatment within a short time, it is preferable and extremely effective to raise a temperature over the Tg once and to gradually cool down around the temperature of Tg. As one of the examples in the case of polyethylene naphthalate, a heat treatment time can remarkably be shortened by keeping the temperature between not lower than 130° C. and 200° C. once, then by cooling down to 125° C. and, finally, by gradually cooling down to 100° C. for 40 minutes. When the resulting beat treated support is measured through a differential thermal analyzer, the endothermic peak is produced in the vicinity of Tg. The higher the endothermic peak is, the harder the core set curling behavior is produced. The heat treatment is to be carried out so as to be, preferably, not less than 100 mcal/g and, further preferably, not more than 200 mcal/g.

To a polyester support of the invention, a sublayer is applicable as an adhesive layer between the support and a silver halide emulsion layer, or a hydrophilic colloidal layer and a backside layer. There is no special limitation to such a backside layer, but they include, for example, an acryl type copolymer such as those given in JP OPI Publication Nos. 59-19941/1984 and 59-77439/1984, a copolymer of a diolefin monomer and a vinyl monomer such as those given in JP OPI Publication No. 57-128332/1982 and a vinylidene chloride copolymer such as those given in JP Examined Publication No. 43-3976/1968 and JP OPI Publication Nos. 64-538/1989 and 3-137637/1991.

These sublayers are also allowed to contain one or more kinds of various additives including, for example, an antihalation agent, a crossover cutting agent, a coloring dye, a pigment, a coating aid, an antifoggant, an antioxidizing agent, a UV-absorbent, a UV stabilizer, an etching processing agent and a matting agent.

A polyester film support relating to the invention has the hydrophobic surface. Therefore, the adhesive property thereof is usually reinforced not only by applying the above-mentioned sublayer thereto, but also by carrying out various surface treatment thereon in advance. Such a surface treatment as mentioned above include, for example, a surface activation treatment such as a corona-discharge treatment, a flame treatment, a UV treatment, a radio-frequency treatment, a glow-discharge treatment, an active plasma treatment and a laser-beam treatment and, besides, a treatment in which an etching treatment is carried out with a chemical such as resorcine, phenol, alkali, amine, and trichloroacetic acid.

Among the surface treatments, a corona-discharge treatment is the most well-known method. The surface treatment can be achieved in any methods known, including, for example, those disclosed in JP Examined Publication Nos. 48-5043/1973 and 47-51905/1972 and JP OPI Publication Nos. 47-28067/1972, 49-83769/1974, 51-41770/1976, 51-131576/1976 and so forth.

It is suitable when the discharge frequency thereof is to be within the range of 50 Hz to 5000 kHz and, preferably, 5 kHz to some hundreds kHz. If the discharge frequency is too low, it is not preferable, because any stable discharge cannot be obtained and a pin hole is produced on a treatment subject. If a frequency is too high, it is also not preferable, because an extra device for an impedance matching use is to be required and the cost becomes higher. For improving the wettability of a plastic film comprising an ordinary polyester or polyolefin, the treating strength of a subject to be treated is suitably within the range of 0.001 KV.A.min/m$^2$ to 5 KV.A.min/m$^2$ and, preferably, 0.01 KV.A.min/m$^2$ to 1 KV-A-min/m$^2$. The gap clearance between an electrode and a dielectric roll is suitably within the range of 0.5 to 2.5 mm and, preferably, 1.0 to 2.0 mm.

In most cases, the most effective surface treatment is a glow-discharge treatment. The glow-discharge treatment can be performed in any treatment methods known so far including, for example, those described in JP Examined Publication Nos. 35-7578/1960, 36-10336/1961, 45-22004/1970, 45-22005/1970, 45-24040/1970 and 46-43480/1971, U.S. Pat. Nos. 3,057,792, 3,057,795, 3,179,482, 3,288,638, 3,309,299, 3,424,735, 3,462,335, 3,475,307 and 3,761,299, British Patent No. 997,093, and JP OPI Publication No. 53-129262/1978. The glow-discharge treatment conditions are generally suitable to be within the range of 0.005 to 20 Torr and, preferably, 0.02 to 2 Torr. If a pressure is too low, the surface treatment effects are deteriorated. If the pressure is too high, it is dangerous because an excess current is so leaked as to be liable to spark, so that a subject to be treated may further be in the danger of being destroyed thereby. The above-mentioned discharge is produced in a vacuum tank by applying a high voltage to one or more gaps between metal plates or metal bars each arranged with the above-mentioned gaps. The voltage may be on various levels according to the composition or pressure of the gas in the atmosphere. However, when it is usually within the above-specific range of the pressures, a stable and constant glow-discharge can be produced between 500 and 5000V. For improving an adhesive property, a particularly preferable voltage is to be within the range of 2000 to 4000V. As seen from the conventional art, a suitable discharge frequency is some thousands MHz from direct current and, preferably, within the range of 50 Hz to 20 MHz. Because a desired adhesive property can be obtained, a discharge treatment strength is suitable to be within the range of 0.01 KV.A.min/m$^2$ to 5 KV.A.min/m$^2$ and, preferably, 0.15 KV.A.min/m$^2$ to 1 KV.A.min/m$^2$.

A silver halide emulsion of a light-sensitive material of the invention can be prepared in the processes described in, for example; Research Disclosure, (RD), No. 17643, pp. 22–23, (Dec. 1978), "Emulsion preparation and types"; ibid., (RD), No. 18716, p. 648; P. Glafkides, Chemie et Physique Photographique, Paul Montel, 1967; F. Duffin, Photographic Emulsion Chemistry, Focal Press, 1966; V. L. Zelikman et al, Making and Coating Photographic Emulsion, Focal Press, 1964; and so forth.

As for the emulsions, the monodisperse type emulsions described in U.S. Pat. Nos. 3,574,628 and 3,665,394 and British Patent No. 1,413,748 are also preferable.

A silver halide emulsion can be physically ripened, chemically ripened and spectrally sensitized. The additives applicable to such a processing steps as mentioned above are given in, for example, RD No. 17643, ibid., No. 18716 and ibid., No. 308119 (hereinafter abbreviated to RD17643, RD18716 and RD308119, respectively).

In the case that a photographic light-sensitive material of the invention is a color photographic light-sensitive material, the photographic additives applicable thereto are also given in the above-mentioned RDs. Besides the above, a variety of couplers may also be used therein. The concrete examples thereof are also given in RD17643 and RD308119.

The above-given additives can be added to a photographic light-sensitive layer in the dispersion methods and the like each described also in RD308119, p. 1007, Item XIV.

To a color photographic light-sensitive material, an auxiliary layer such as the filter layer, an interlayer and so forth each described in the foregoing RD308119, Item VII-K may be provided.

When constituting a color photographic light-sensitive material, various layer arrangements such as a regular layer arrangement, a reverse layer arrangement and a unit layer structure may be adopted.

For developing a silver halide photographic light-sensitive material of the invention, the developing agents having well-known as themselves such as those given in T. H. James, The Theory of The Photographic Process, Forth Edition, pp. 291–334, and Journal of the American Chemical Society, Vol. 73, p. 3,100, (1951) may be used. A color photographic light-sensitive material can be processed in any ordinary processes described in the foregoing RD17643, pp. 28–29, RD18716, p. 615 and RD308119, XIX.

EXAMPLES

Now, the invention will be detailed with reference to the following examples. However, the embodiments of the invention shall not be limited thereto.

Example 1

Preparation of Support

As a transesterification catalyst, 0.1 parts by weight of calcium acetate anhydride were added to 100 parts by weight of dimethyl 2,6-naphthalenedicarboxylate and 60 parts by weight of ethylene glycol, and a transesterification reaction was carried out in an ordinary method. The resulting product was added by 0.05 parts by weight of antimony trioxide and 0.03 parts by weight of trimethyl acetate. Next, the resulting mixture was polymerized under the conditions where the temperature was gradually raised and the pressure was reduced at 290° C. and 0.05 mmHg, so that polyethylene-2,6-naphthalate having an intrinsic viscosity of 0.60 was obtained.

After drying the resulting product in vacuum at 150° C. for 8 hours, it was fusedly extruded layerwise from T-die at 300° C. and the extrusion was brought into close contact with a cooling drum having a temperature of 50° C. while applying static electricity thereto, so that the extrusion was so cooled down as to be solidified and, thereby an unstretched sheet could be prepared. The resulting unstretched sheet was 3.3 times stretched in the longitudinal direction at 135° C. by means of a roll type longitudinal stretching machine.

By making use of a tainter type lateral stretching machine, the resulting uniaxially stretched film was stretched by 50% of the whole lateral stretching ratio at 145° C. in the first stretching zone and then stretched by 3.3 times more than the whole lateral stretching ratio at 155° C. in the second stretching zone. Next, the resulting stretched film was heat treated at 100° C. for 2 seconds and the first heat fixing zone was further heatedly fixed at 200° C. for 5 seconds and the second heat fixing zone was heatedly fixed at 240° C. for 15 seconds. Then, the resulting heatedly fixed film was gradually cooled down to room temperature by taking 30 seconds while carrying out a 5% lateral loosening treatment, so that a 85 μm-thick polyethylene naphthalate film could be prepared.

The resulting film was wound round a stainless-steel-made core and was then heat treated at 110° C. for 48 hours, so that a support could be prepared.

A 12 W/m²/min corona discharge was applied to the both sides of the resulting support. On one side thereof, sublayer coating solution B-1 was so coated as to have a dried layer thickness of 0.4 μm. To the resulting coated surface, a 12 W/m²/min corona discharge was applied, and sublayer coating solution B-2 was so coated as to have a dried layer thickness of 0.06 μm.

On the other side applied with a 12 W/m²/min corona discharge treatment, sublayer coating solution B-3 or B-4 was so coated as to have a dr%ed layer thickness of 0.2 μm. Further to the coated side, a 12 W/m²/min corona discharge was applied, and one of aqueous-dispersible coating solutions R-1 through R-8 and U-1 through U-8 was so coated as to have a dried layer thickness of 0.2 μm. As a comparative example, an example was also prepared by no coating made on B-3 or B-4.

After each of the layers was coated, they were dried at 90° C. for 10 seconds and then four layers were coated, a heat treatment was successively carried out at 110° C. for 2 minutes. Thereafter, a cooling treatment was carried out at 50° C. for 30 seconds.

| Sublayer Coating Solution B-1: | |
|---|---|
| A copolymerized latex solution of 30% by weight of butyl acrylate, 20% by weight of t-butyl acrylate, 25% by weight of styrene and 25% by weight of 2-hydroxyethyl acrylate (having a solid component: 30%) | 125 g |
| Compound (UL-1) | 0.4 g |
| Hexamethylene-1,6-bis (ethylene urea) | 0.05 g |
| Add water to make | 1000 ml |
| Sublayer Coating Solution B-2: | |
| Gelatin | 10 g |
| Compound (UL-1) | 0.2 g |
| Compound (UL-2) | 0.2 g |
| Compound (UL-3) | 0.1 g |
| Silica particle (having an average particle size of 3 μm) | 0.1 g |
| Add water to make | 1000 ml |
| Sublayer Coating Solution B-3: | |
| A copolymerized latex solution of 40% by weight of butyl acrylate, 20% by weight of styrene and 40% by weight of glycidyl acrylate (having a solid component: 30%) | 40 g |
| Compound (UL-1) | 0.4 g |
| Tin oxide sol, manufactured by Tagi Chemical Co., (having a solid component: 10%) | 360 g |
| Add water to make | 1000 ml |
| Sublayer Coating Solution B-4: | |
| A copolymerized latex solution of 40% by weight of butyl acrylate, 20% by weight of styrene and 40% by weight of glycidyl acrylate (having a solid component: 30%) | 270 g |
| Compound (UL-1) | 0.6 g |
| Add water to make | 1000 ml |

-continued

UL-1

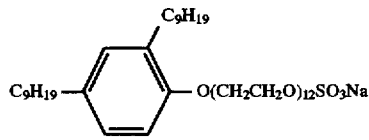

UL-2

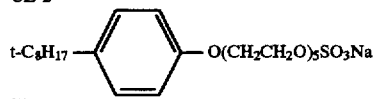

UL-3

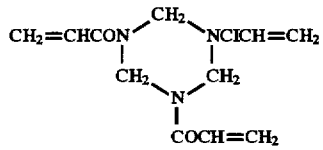

Coating Solution R-1

In an ordinary process, there copolymerized the following compounds; 40 mol % of dimethyl terephthalate, 30 mol % of dimethyl isophthalate, 10 mol % of sodium salt of dimethyl 5-sulfoisophthalate and 20 mol % of 1,4-cyclohexane dicarboxylate each as the dicarboxylic acid components of the copolymer, and 70 mol % of ethylene glycol and 30 mol % of 1,4-cyclohexane dicarboxylic acid each as the glycol components thereof. Resulting copolymer A was stirred in hot water at 95° C. for 3 hours, and the resulting solution was named aqueous dispersion A of 15% by weight. The aqueous dispersion A of 130 g and compound (UL-1) of 0.4 g were mixed together and water was added to dilute it to make 1000 ml.

Coating Solution R-2

In an ordinary process, there polymerized 50 mol % of dimethyl terephthalate and 50 mol % of dimethyl isophthalate as the dicarboxylic acid components of the copolymer and 50 mol % of ethylene glycol and 50 mol % of diethylene glycol as the glycol components thereof.

The resulting copolymer B was stirred in hot water at 95° C. for 3 hours, and the resulting solution was named aqueous dispersion A of 15% by weight. The aqueous dispersion B of 130 g and compound (UL-1) of 0.4 g were mixed together and water was added to dilute it to make 1000 ml.

Coating Solution R-3

In aqueous dispersion A, a solution prepared by mixing 10 mol % of acrylamide, 20 mol % of glycidyl methacrylate, 60 mol % of styrene and 10 mol % of ethyl acrylate was so used as to be 20% by weight of polyester copolymer A in terms of the solid, so that an emulsification copolymerization thereof was carried out by making use of ammonium peroxide serving as a polymerization initiator and, thereby aqueous dispersion C of 15% by weight of acryl-denatured polyester copolymer C was prepared. The aqueous dispersion C of 130 g and compound (UL-1) of 0.4 g were mixed together and water was added to dilute it to make 1000 ml.

Coating Solution R-4

In aqueous dispersion B, a solution prepared by mixing 10 mol % of acrylamide, 15 mol % of glycidyl methacrylate and 75 mol % of styrene was so used as to be 20% by weight of polyester copolymer B in terms of the solid, so that an emulsification copolymerization thereof was carried out by making use of ammonium peroxide serving as a polymerization initiator and, thereby aqueous dispersion D of 10% by weight of acryl-denatured polyester copolymer D was prepared. The aqueous dispersion D of 130 g, compound (UL-1) of 0.4 g and 1.0 g of Spherica Slurry 300 (having an average particle size of 0.27 μm and a solid proportion of 20% by weight) manufactured by Catalyst Chemical Industrial Co., were mixed together, and water was added to dilute it to make 1000 ml.

Coating Solution R-5

Compound (UL-1) of 0.4 g and 130 g of a copolymer latex (having a solid proportion of 30% by weight) containing 10 mol % of acrylamide, 20 mol % of glycidyl methacrylate, 60 mol % of styrene and 10 mol % of ethyl acrylate were mixed together and water was added to dilute it to make 1000 ml.

Coating Solution R-6

Sixty (60) grams of antimony-doped tin oxide powder, SN-100P manufactured by Ishihara Sangyo Co., and 267 g of aqueous dispersion B (having a solid proportion of 15% by weight) were mixed together. The resulting solution was diluted by adding water to make 400 g and dispersed by a stirrer and a sand-mill so as to prepare aqueous dispersion E of 25% by weight. The resulting aqueous dispersion E of 400 g and 0.6 g of compound (UL-1) were mixed together and the resulting solution was diluted by adding water to make 1000 ml.

Coating Solution R-7

Sixty (60) grams of antimony-doped tin oxide powder, SN-100P manufactured by Ishihara Sangyo Co., 200 g of aqueous dispersion B (having a solid proportion of 15% by weight) and 100 g of a copolymer latex of ethyl acrylate, methyl methacrylate and methacrylic acid (having a mol ratio of ethyl acrylate/methyl methacrylate/mathacrylic acid=45/45/10 and a solid proportion of 10% by weight) were mixed together. The resulting solution was diluted by adding water to make 400 g and dispersed by a stirrer and a sand-mill so as to prepare aqueous dispersion F of 25% by weight. The resulting aqueous dispersion F of 400 g and 0.6 g of compound (UL-1) were mixed together and the resulting solution was diluted by adding water to make 1000 ml.

Coating Solution R-8

Sixty (60) grams of antimony-doped tin oxide powder, SN-100P manufactured by Ishihara Sangyo Co., 40 g of polyester, "Bylon 200" manufactured by Toyobo Spinning Co., 900 g of methylethyl ketone and 100 g of cyclohexane were mixed together, and the resulting mixture was dispersed by a sandmill.

Coating Solution U-1

To a mixture of 41 parts by weight of polyester of adipinic acid and butanediol (molecular weight; 2000) and 6 parts by weight of propaneoxy adduct of 2-butene-1,4-diol and sodium bisulfite, $H(OCH_2CH_2CH_2)nOCH_2CH(SO_3H)CH_2CH_2O(CH_2CH_2CH_2O)nH$ (molecular weight; 400), was added 16 parts by weight of isophoronediisocyanate at 70° C. The mixture was further stirred at 100° C. until the NCO content was reached to 53% . The resulting prepolymer was cooled down to 60° C. and 10 parts by weight of bisketymine which was obtained by masking the amino group of isophoronediamine with MIBK, i.e.,methyl isobutyl ketone (masked amino group; 98%) was added thereto. Water of 100 parts by weight was further added, with vigorous stirring, to obtain an aqueous dispersion having a solid content of 40%.

Coating Solution U-2

To a mixture of 65 parts by weight of 2,2-dimethylolpropionic acid, 720 parts by weight of fused polytetramethylene-ether-glycol (molecular weight; ca.2000) and 200 parts by weight of dimethylformamide, was added 300 parts by weight of 4,4'-methylenebis (cyclohexylisocyanate) to cause reaction thereof. The reaction mixture was diluted with 1000 parts by weight of acetone to obtain a urethane prepolymer having terminal isocyanate group, which was proved to have the NCO content of 1.1%, an acid value of 11.6, a nonvolatile component of 47% and a viscosity of 2 Stokes. To the prepolymer of 1575 parts by weight, were slowly added triethylamine of 25 parts by weight and water of 895 parts by weight, and thereto were added diethyltriamine of 20 parts by weight and water of 120 parts by weight. Further, water of 530 parts by weight was added and then acetone was removed by distilation to prepare an aqueous dispersion having a solid content of 31%.

Coating Solution U-3

There was employed an aqueous-dispersion of polyurethane resin, Takelak XW-76-P15 (solid content; 33%) produced by Takeda Yakuhin Kogyo.

Coating Solution U-4

There was employed an aqueous-dispersion of polyurethane resin, Takelak W-6015 (solid content; 30%) produced by Takeda Yakuhin Kogyo.

Coating Solution U-5

Coating solution U-2 of 100 parts by weight was mixed with 50 parts by weight of latex (solid content; 20%) of copolymer of ethylacrylate, methylmethaacrylate and methaacrylic acid (molar ratio; 45/45/10) to obtain a coating solution U-5 (solid content; 27%).

Coating Solution U-6

A latex of copolymer of ethylacrylate, methylmethaacrylate and methaacrylic acid (molar ratio; 45/45/10, solid content of 20%).

Coating Solution U-7

60 Parts by weight of powder of antimony-doped tin oxide, SN-100P produced by Ishihara Sangyo was mixed with 130 parts by weight of the coating solution U-2. Water of 310 parts by weight was added and the mixture was dispersed with a stirrer and sand-mill to obtain a coating solution U-7.

Coating Solution U-8

There were mixed 60 parts by weight of powder of antimony-doped tin oxide, SN-100P produced by Ishihara Sangyo, 40 parts by weight of a urethane resin, UR-8200 produced by Toyobo, 500 parts by weight of methyl ethyl ketone and 500 parts by weight of toluene. Further, the mixture was dispersed with a disolver and sand-mill to obtain a coating solution U-8.

Next, on the surface coated with an aqueous-dispersion coating solution, either one of the following magnetic recording layer coating solutions M-1 through M-5 so as to have a dried layer thickness of 0.8 µm. Further thereon, lubrication layer O-1 was coated so as to have a dried layer thickness of 0.02 µm. After completing the coating, each of the layers was dried at 80° C. for 10 seconds and was successively heat-treated at 90° C. for 2 minutes.

Coating Solution M-1

A mixture of 82 g of diacetyl cellulose, 6.6 g of Co-adhered $\gamma$-$Fe_2O_3$ (having a major axis length of 0.8 µm, $Fe^{2+}/Fe^{3+}$=0.2 and Hc=600 Oe.), 4 g of $\alpha$-alumina (having an average particle size of 0.5 µm), 990 g of acetone and 110 g of cyclohexanone was made and it was further mixed well by a dissolver for one hour. Thereafter, the resulting mixture was dispersed by a sand-mill for 2 hours so as to prepare a dispersion.

Coating Solution M-2

This was prepared by making use of nitrocellulose in place of diacetyl cellulose used in coating solution M-1.

Coating Solution M-3

A mixture of 82 g of a copolymer of butyl acetate and vinyl chloride (having a proportion of butyl acetate/vinyl chloride=50/50), 6.6 g of Co-adhered $\gamma$-$Fe_2O_3$, 4 g of $\alpha$-alumina (having an average particle size of 0.5 µm), 500 g of methylethyl ketone, 400 g of toluene and 100 g of cyclohexanone was made and it was further mixed well by a dissolver for one hour. Thereafter, the resulting mixture was dispersed by a sand-mill for 2 hours so as to prepare a dispersion.

Coating Solution M-4

This was prepared by making use of 82 g of urethane resin, UR-8200 manufactured by Toyobo Spinning Co. in place of the butyl acetate/vinyl chloride copolymer used in coating solution M-3.

Coating Solution M-5

A kneaded dispersion of 135 g of aqueous polyurethane (having a solid proportion of 30% by weight), XW76-P15 manufactured by Takeda Pharmaceutical Co., 5 g of Co-adhered $\gamma Fe_2O_3$ and 4 g of $\alpha$-alumina (having an average particle size of 0.5 µm) was so prepared as to serve as a dispersion.

Coating Solution O-1:

| Carnauba wax | 7 g |
| Toluene | 700 g |
| Methylethyl ketone | 300 g |

Preparation of Light-sensitive Material

The identical photographic emulsion layer to that of Konica Color LV400 color negative film manufactured and marketed by Konica Corp. was coated, after applying a corona-discharge to the surface coated with sublayer coating solution B-2.

Each of the resulting samples was processed in the following manner.

| (Development process) | | |
|---|---|---|
| 1. | Color developing | 3 min. 15 sec. 38.0 ± 0.1° C. |
| 2. | Bleaching | 6 min. 30 sec. 38.0 ± 3.0° C. |
| 3. | Washing | 3 min. 15 sec. 24–41° C. |
| 4. | Fixing | 6 min. 30 sec. 38.0 ± 3.0° C. |
| 5. | Washing | 3 min. 15 sec. 24–41° C. |
| 6. | Stabilizing | 3 min. 15 sec. 38.0 ± 3.0° C. |
| 7. | Drying | Not higher than 50° C. |

The compositions of the processing solutions used in each process will be given below.

| (Color developer) | |
|---|---|
| 4-amino.3-methyl-N-ethyl-N-($\beta$-hydroxyethyl)aniline.sulfate | 4.75 g |
| Anhydrous sodium sulfite | 4.25 g |
| Hydroxylamine.½ sulfate | 2.0 g |
| Anhydrous potassium carbonate | 37.5 g |
| Sodium bromide | 1.3 g |
| Sodium nitrilotriacetate (monohydrate) | 2.5 g |

| | | |
|---|---|
| Potassium hydroxide | 1.0 g |
| Add water to make | 1 liter |
| | (pH = 10.1) |
| (Bleach) | |
| | |
| Ammonium iron (III) ethylenediamine tetraacetate | 100.0 g |
| 2-ammonium ethylenediamine tetraacetate | 10.0 g |
| Ammonium bromide | 150.0 g |
| Glacial acetic acid | 10.0 g |
| Add water to make | 1 liter |
| Adjust pH with aqueous ammonia to be | pH = 6.0 |
| (Fixer) | |
| | |
| Ammmonium thiosulfate | 175.0 g |
| Anhydrous sodium sulfite | 8.5 g |
| Sodium metasulfite | 2.3 g |
| Add water to make | 1 liter |
| Adjust pH with acetic acid to be | pH = 6.0 |
| (Stabilizer) | |
| | |
| Formalin (in an aqueous 37% solution) | 1.5 ml |
| Konidux (manufactured by Konica Corp.) | 7.5 ml |
| Add water to make | 1 liter |

A layer adhesion produced in the dried state before subjecting to processing of the resulting color negative film (hereinafter referred to as a raw layer adhesion), a layer adhesion produced in the dried state after completing the processing (hereinafter referred to as a dried layer adhesion), and a scratch resistance were evaluated in the following manners.

Layer Adhesion Evaluation
(Raw & Dried Layer Adhesion)

With a sample before starting the development thereof, or with a sample dried up after completing the development thereof, the surface of the back layer was cut with a razor's edge at an angle of 45° penetrating to the support and, thereon an adhesive tape (made of cellophane) was tightly pasted and was then rapidly peeled off at an angle of about 45°. At that moment, the area of the back layer peeled off together with the tape was compared to the area pasted with the tape, and the following five graded evaluation was made.

| Peeled-Off State | |
|---|---|
| Evaluation grade 5: | Not peeled off at all |
| 4: | 0–20% |
| 3: | 21–50% |
| 2: | 51–100% |
| 1: | Not less than 101% |

When the evaluation grade was 4 or more, it can be considered that the subject layer adhesion was strong enough for practical use.

Scratch Resistance

After allowing the developed sample to stand for 12 hours at 23° C. and 55 % RH, a sapphire needle having a 25 μm-diameter point was pricked up vertically on the back surface of the sample and thereby the surface was scratched by applying a continuous load of 0 to 50 g at a rate of 10 mm/second. The scratched sample was put on a viewing box. When the transmitted scratch image began to be seen thereon, the withstand load strength obtained at that moment was regarded as a scratch resistance. The more the value of the strength is, the more the scratch resistance is excellent.

The results thereof will be shown in Table 1.

TABLE 1

| Sample No. | Backing layer | | | Raw layer adhesion | Dried layer adhesion | Scratch resistance (in g) | Remarks |
|---|---|---|---|---|---|---|---|
| | 1st layer | 2nd layer | Magnetic layer | | | | |
| 1 | B-3 | R-1 | M-1 | 5 | 4 | 49 | Inv. |
| 2 | B-3 | R-2 | M-1 | 5 | 4 | 48 | Inv. |
| 3 | B-3 | R-3 | M-1 | 5 | 5 | 50 | Inv. |
| 4 | B-3 | R-3 | M-2 | 5 | 5 | 41 | Inv. |
| 5 | B-3 | R-3 | M-3 | 5 | 5 | 32 | Inv. |
| 6 | B-3 | R-3 | M-4 | 5 | 5 | 28 | Inv. |
| 7 | B-3 | R-3 | M-5 | 5 | 5 | 13 | Inv. |
| 8 | B-3 | R-4 | M-1 | 5 | 5 | 50 | Inv. |
| 9 | B-3 | R-5 | M-1 | 2 | 1 | 16 | Comp. |
| 10 | B-3 | B-4 | M-1 | 2 | 2 | 14 | Comp. |
| 11 | B-3 | None | M-1 | 3 | 3 | 40 | Comp. |
| 12 | B-4 | R-6 | M-1 | 5 | 4 | 48 | Inv. |
| 13 | B-4 | R-7 | M-1 | 5 | 5 | 50 | Inv. |
| 14 | B-4 | R-7 | M-2 | 5 | 5 | 42 | Inv. |
| 15 | B-4 | R-7 | M-4 | 5 | 5 | 26 | Inv. |
| 16 | B-4 | R-7 | M-5 | 5 | 5 | 12 | Inv. |
| 17 | B-4 | R-8 | M-1 | 2 | 1 | 13 | Comp. |
| 18 | R-7 | R-5 | M-1 | 2 | 1 | 12 | Comp. |
| 19 | R-7 | B-4 | M-1 | 1 | 1 | 10 | Comp. |
| 20 | None | R-6 | M-1 | 5 | 4 | 45 | Inv. |
| 21 | None | R-7 | M-1 | 5 | 5 | 47 | Inv. |
| 22 | None | R-8 | M-1 | 1 | 1 | 11 | Comp. |
| 23 | B-4 | None | M-1 | 1 | 1 | 9 | Comp. |
| 24 | B-3 | U-1 | M-1 | 5 | 4 | 49 | Inv. |
| 25 | B-3 | U-2 | M-1 | 5 | 4 | 48 | Inv. |
| 26 | B-3 | U-3 | M-1 | 5 | 5 | 50 | Inv. |
| 27 | B-3 | U-4 | M-1 | 5 | 4 | 46 | Inv. |
| 28 | B-3 | U-5 | M-1 | 5 | 5 | 49 | Inv. |
| 29 | B-3 | U-5 | M-2 | 5 | 5 | 40 | Inv. |
| 30 | B-3 | U-5 | M-3 | 5 | 4 | 31 | Inv. |
| 31 | B-3 | U-5 | M-4 | 5 | 5 | 37 | Inv. |
| 32 | B-3 | U-5 | M-5 | 5 | 5 | 16 | Inv. |

TABLE 1-continued

| Sample No. | Backing layer 1st layer | Backing layer 2nd layer | Magnetic layer | Raw layer adhesion | Dried layer adhesion | Scratch resistance (in g) | Remarks |
|---|---|---|---|---|---|---|---|
| 33 | B-3 | U-6 | M-1 | 2 | 2 | 13 | Comp. |
| 34 | B-3 | B-4 | M-1 | 2 | 1 | 12 | Comp. |
| 35 | B-3 | None | M-1 | 3 | 3 | 40 | Comp. |
| 36 | B-4 | U-7 | M-1 | 5 | 5 | 45 | Inv. |
| 37 | B-4 | U-7 | M-2 | 5 | 4 | 41 | Inv. |
| 38 | B-4 | U-7 | M-4 | 5 | 5 | 38 | Inv. |
| 39 | B-4 | U-7 | M-5 | 5 | 5 | 15 | Inv. |
| 40 | B-4 | U-8 | M-1 | 2 | 1 | 12 | Comp. |
| 41 | U-7 | U-6 | M-1 | 2 | 1 | 10 | Comp. |
| 42 | U-7 | B-4 | M-1 | 1 | 1 | 9 | Comp. |
| 43 | None | U-7 | M-1 | 5 | 4 | 43 | Inv. |
| 44 | None | U-8 | M-1 | 1 | 1 | 10 | Comp. |

Inv.: Invention
Comp.: Comparison

As can be seen from the results, the constitution of the present invention achieved excellent effects.

With regard to the magnetic recording layer, it was proved that a coating solution thereof containing an organic solvent led to improved results in scratch resistance.

Example 2

Samples were prepared in the same manner as in Sample No. 3 or 26 of Example 1, except that a polyethylene naphthalate film support was replaced by a 90 μm-thick polyethylene terephthalate (PET) film support, and the resulting samples were referred to as Sample Nos. 45 and 46, respectively. Besides the above, another sample was prepared in the same manner as in Sample Nos. 3 or 26 of Example 1, except that a 90 μm-thick film of the condensate of terephthalic acid/naphthalene dicarboxylic acid/adipic acid/5-sulfoisophthalic acid/ethylene glycol (in a proportion of 20/70/6.5/3.5/100) was used as the support thereof, and the resulting sample were referred to as Sample No. 47 and 48.

On the other hand, on the back side of a 115 μm-thick cellulose triacetate, a coating solution composition for antistatic layer use was so coated as to have a dried layer thickness of 0.2 μm. Further thereon, coating solutions of Example 1, M-1 (having a dried layer thickness of 0.8 μm) and O-1 (having a dried layer thickness of 0.02 μm), were each coated.

(Coating solution for Antistatic Layer)

Sixty (60) grams of antimony-doped tin oxide powder, SN-100P manufactured by Ishihara Sangyo Co., 267 g of aqueous dispersion B (having a solid proportion of 15% by weight), 250 g of pure water, 100 g of methanol and 50 g of N,N-dimethyl formamide were each dispersed together by making use of a stirrer and a sand-mill.

To the side of a support for coating an emulsion layer, a sublayer having the following composition was arranged.

| (Solution for coating the sublayer) | |
|---|---|
| Gelatin | 1 g |
| Distilled water | 1 g |
| Acetic acid | 1 g |
| Methanol | 50 g |

| -continued | |
|---|---|
| (Solution for coating the sublayer) | |
| Acetone | 50 g |
| N,N-dimethyl formamide | 4 g |

After completing the coating, each layer was dried at 90° C. for 10 seconds. Thereafter, a heat treatment was carried out at 110° C. for 2 minutes. Then, the same emulsion layer as in Example 1 was coated on the above-mentioned sublayer. The resulting samples were named Sample Nos. 49 and 50.

With the resulting samples, the raw layer adhesion, dried layer adhesion and scratch resistance thereof were evaluated in the same manners as in Example 1. Besides, the perforation process described in JIS K7519-1982 was carried out thereto and the resulting perforation strength thereof was measured in the following manner.

By making use of Tensilon RTA-100 manufactured by Orientech Co., end portion 3 of a perforation strength measurement jig was caught by the chuck of Tensilon. The perforation section of a 250 mm-length film was out in sprocket 1 and the film was let pass. A 100 g-weight was suspended from film-end 2. The other film-end 4 was caught by a chuck and was then jerked at a rate of 40 mm/min. The maximum load obtained when breaking the perforations was regarded as a perforation strength.

The results thereof will be shown in Table 2.

TABLE 2

| Sample No. | Raw layer adhesion | Dried layer adhesion | Scratch resistance (in g) | Perforation strength (in Kg = f) |
|---|---|---|---|---|
| 3 | 5 | 5 | 50 | 17 |
| 45 | 5 | 5 | 46 | 14 |
| 47 | 5 | 5 | 41 | 10 |
| 49 | 4 | 3 | 18 | 7 |
| 26 | 5 | 5 | 50 | 17 |
| 46 | 5 | 5 | 47 | 14 |
| 48 | 5 | 5 | 42 | 10 |
| 50 | 4 | 3 | 16 | 7 |

As can be seen from Table 2, samples which comprised a polyester support having thereon layer arrangements of the present invention were proved to be superior in adhesion and scratch resistance. It is noted that PEN as a support was excellent in perforation strength, althogh its thickness (85

μm) was the thinnest, so that it is suitable for a small format patrone or camera.

On the contrary, the use of TAC was proved to be inferior not only in adhesion and scratch strength but also in perforation strength, so that it is not suited for a thin-film and small format.

What is claimed is:

1. A silver halide photographic light-sensitive material comprising:

(a) a polyester support;

(b) a silver halide emulsion layer coated on one side of said polyester support;

(c) a resin layer coated on the other side of said polyester support, said resin layer comprising an antistatic agent selected from the group consisting of a conductive polymer and a metal oxide, and a resin selected from the group consisting of an aqueous-dispersible polyester resin and an aqueous-dispersible polyurethane resin; and (d) a magnetic layer coated on said resin layer.

2. The silver halide photographic material of claim 1, wherein said polyester resin or polyurethane resin is contained in the form of a solid particle dispersion.

3. The silver halide photographic material of claim 1, wherein said polyester resin is a polyester comprising, as a copolymerizing component, a hydrophilic component selected from a component having a sulfonate group, diethylene glycol and polyalkylene ether glycol.

4. The silver halide photographic material of claim 3, wherein said polyester resin is polyester comprising, as copolymerizing component, an aromatic dicarboxylic acid having a sulfonate group.

5. The silver halide photographic light-sensitive material of claim 1, wherein said resin layer contains an aqueous polyester resin.

6. The silver halide photographic material of claim 1, wherein said magnetic recording layer contains a cellulose ester selected from cellulose diacetate, cellulose acetatebutylate and cellulose acetatepropionate.

7. The silver halide photographic material of claim 6, wherein said magnetic recording layer contains cellulose diacetate.

8. The silver halide photographic material of claim 1, wherein said polyester support mainly comprises polyethylene-2,6-naphthalate.

9. The silver halide photographic material of claim 1, wherein said layer containing the polyester resin or polyurethane resin is formed by coating a dispersion of solid particles of the polyester resin or polyurethane resin dispersed in an aqueous medium.

10. The silver halide photographic material of claim 1, wherein said metal oxide is selected from the group consisting of $ZnO$, $TiO_2$, $SnO_2$, $Al_2O_3$, $In_2O_3$, $SiO_2$, $MgO$, $BaO$, $MoO_2$, $V_2O_5$, $HfO_2$, $ThO_2$, $ZrO_2$, $CeO_2$ and a composite oxide thereof.

11. The silver halide photographic material of claim 10, wherein said metal oxide is selected from the group consisting of $ZnO$, $TiO_2$ and $SnO_2$.

* * * * *